US006683723B2

(12) United States Patent
Frosig et al.

(10) Patent No.: US 6,683,723 B2
(45) Date of Patent: Jan. 27, 2004

(54) SOLID IMMERSION LENS ARRAY AND METHODS FOR PRODUCING AND USING SOLID IMMERSION LENS ARRAY WITH FIDUCIAL MARKS

(75) Inventors: Peter A. Frosig, Rochester, NY (US); Anne E. Bohan, Pittsford, NY (US); John P. Spoonhower, Webster, NY (US); David L. Patton, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 14 days.

(21) Appl. No.: 10/171,120

(22) Filed: Jun. 13, 2002

(65) Prior Publication Data

US 2003/0231400 A1 Dec. 18, 2003

(51) Int. Cl.[7] .................. G02B 27/10; G02B 21/34; G02B 21/00; G02B 3/00
(52) U.S. Cl. .................. 359/626; 359/396; 359/368; 359/398; 359/664
(58) Field of Search .................. 359/368, 391, 359/393, 396, 398, 626, 656, 664, 719

(56) References Cited

U.S. PATENT DOCUMENTS

| 4,598,039 | A |   | 7/1986  | Fischer et al. ....... 430/323 |
| 4,833,382 | A |   | 5/1989  | Gibbs ............ 318/640 |
| 5,771,085 | A |   | 6/1998  | Ochi et al. ........... 349/158 |
| 5,850,276 | A |   | 12/1998 | Ochi et al. ........... 349/158 |
| 6,005,294 | A |   | 12/1999 | Tsuji et al. ........... 257/797 |
| 6,096,155 | A |   | 8/2000  | Harden et al. ........ 156/240 |
| 6,175,642 | B1 |  | 1/2001  | Gobbi et al. ......... 382/128 |
| 6,515,800 | B1 | * | 2/2003  | Border et al. ........ 359/619 |
| 6,587,274 | B1 | * | 7/2003  | Border et al. ........ 359/619 |
| 6,594,084 | B1 | * | 7/2003  | Border et al. ........ 359/619 |
| 2003/0117482 | A1 | * | 6/2003 | Border et al. ........ 347/224 |
| 2003/0118071 | A1 | * | 6/2003 | Border et al. ........ 372/50 |
| 2003/0118290 | A1 | * | 6/2003 | Border et al. ........ 385/52 |

OTHER PUBLICATIONS

"Imaging with Solid Immersion Lenses, Spatial Resolution, and Applications", Qiang Wu, Member, IEEE, Luke P. Ghislain, Member, IEEE, and V. B. Elings, Proceedings of the IEEE, vol. 88, No. 9, Sep. 2000, pp. 1491–1498.

"Fields Associated With The Solid Immersion Lens", G.S. Kino, Ginzton Laboratory, Stanford University, Stanford, CA, Proceedings of the SPIE, vol. 3467, pp. 128–137, 1998.

* cited by examiner

Primary Examiner—David N. Spector
(74) Attorney, Agent, or Firm—Frank Pincelli

(57) ABSTRACT

A near field solid immersion lens array, method of using, and making a near field solid immersion lens array. A cover slide is provided having a near field solid optical lens array having least one fiducial mark. The fiducial mark is used by a positioning device for locating the position of each of the lens in the array. A unique identifier may be provided for locating information of the position of each lens in the array that can be used for driving the positioning device.

28 Claims, 5 Drawing Sheets

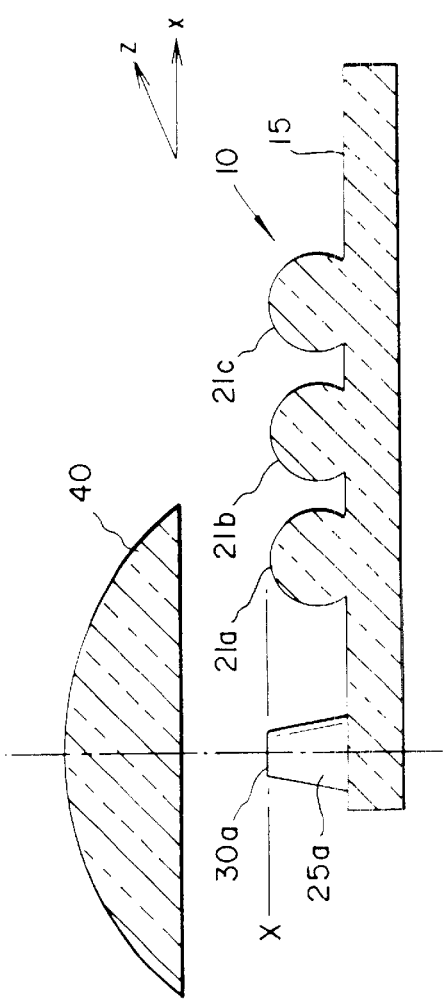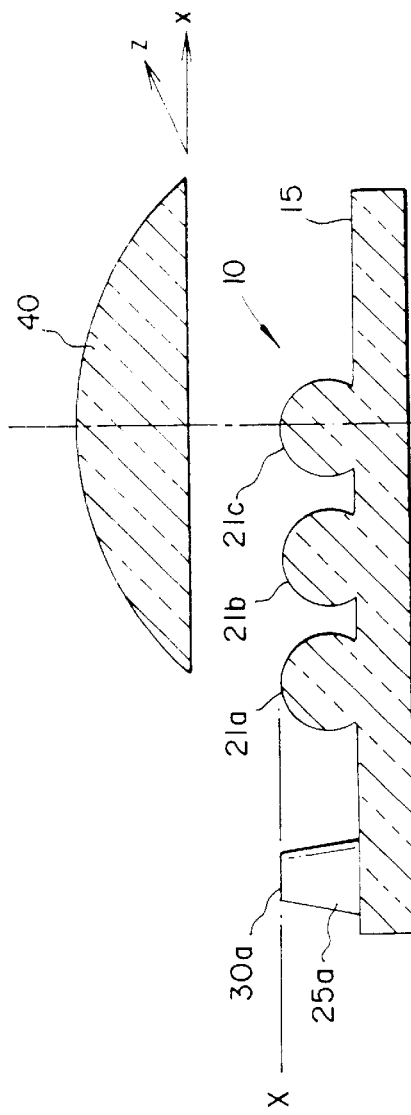

SOLID IMMERSION LENS ARRAY AND METHODS FOR PRODUCING AND USING SOLID IMMERSION LENS ARRAY WITH FIDUCIAL MARKS

CROSS-REFERENCE TO RELATED APPLICATIONS

Reference is made to commonly assigned, U.S. patent application Ser. No. 10/171,168, filed Jun. 13, 2002, entitled: SOLID IMMERSION LENS ARRAY AND METHODS FOR PRODUCING A SOLID IMMERSION LENS ARRAY in the names of David L. Patton, John P. Spoonhower, Anne E. Bohan and Gustavo R. Paz-Pujalt.

FIELD OF THE INVENTION

This invention relates to an article, system and method used for creating solid immersion lens array with marks.

BACKGROUND OF THE INVENTION

Recent advances in optics provide for a method of image capture on a length scale much smaller than previously realized. Such near-field optical methods are realized by placing an aperture or a lens in close proximity to the surface of the sample to be imaged. Others (see, for example, the review by Q. Wu, L. Ghislain, and V. B. Elings, Proc. IEEE (2000), 88(9), pg. 1491–1498) have developed means of exposure by the use of the solid immersion lens (SIL). Special methods for positioning control of the aperture or lens are required, as the distance between the optical elements (aperture or lens) and the sample is extremely small. The SIL can be positioned within approximately 0.5 micrometer of the target surface by the use of special nano-positioning technology. SIL technology offers the advantage that the lens provides a true image capture capability. For example, features in a real object can be faithfully captured in an image of reduced spatial extent. In the case of the SIL, images can be captured much smaller than the image size achievable through the use of conventional or classical optics. Such conventional optics are said to be diffraction-limited because the size of the smallest feature in an image is limited by the physical diffraction.

If a SIL is placed in contact with the sample under examination, illumination can be more readily focused on it, and use of the high NA of the system allows efficient collection of the excitation light with high optical transmission efficiency and observation of the sample with very high resolution. Methods for molding a single solid immersion lens as part of a are disclosed in U.S. Pat. No. 6,301,055. Illumination of a limited field of view within a single flow channel of a sample material is described.

The problem is that a single solid immersion lens mounted on a microscope or attached as an integral part of a limits the area of view of the sample to a single location, the area directly beneath the solid immersion lens. A method for molding a multiplicity of solid immersion lenses as part of a cover slide is described in U.S. patent application Ser. No. 10/171,168 entitled "Solid Immersion Lens Array And Methods For Producing Solid Immersion Lens Array" by David L. Patton et al., filed concurrently herewith.

In near-field microscopy, the solid immersion lens is used in a microscope in conjunction with other optical elements such as the microscope objective. To avoid large losses in a multi-lens system, the alignment of each lens and optical article with subsequent lenses and optical articles must be very precise. Fiducial marks are often created on the lenses and optical articles outside the optical ray path to serve as a reference point during alignment. Fiducial marks are particularly important in the case of aspheric lenses and lens arrays where it is difficult to identify the center of the lens during alignment activities. As optical systems get smaller for fiber optics applications, like telecommunications and optical sensors, the need increases for precise alignment of the optical components and the accuracy of the associated fiducial marks. Alignment specifications of two (2) microns are now common with a desire to deliver sub-micron alignment accuracy. Consequently, the fiducial marks must be located with an accuracy of one micron or better.

Fiducial marks are well known in the semi-conductor manufacturing industry as an important tool for making multi-layer semiconductors. In this case, the fiducial marks are incorporated as part of the semiconductor circuit plan. Due to the thinness (50–100 micron) of the semiconductor layers used in making multi-layer semiconductors, the fiducial marks of multiple semiconductor layers can be viewed simultaneously in separate layers using a high magnification microscope. The high magnification microscope aids in positioning the fiducial marks of one semiconductor layer over the fiducial marks of another semiconductor layer during the alignment process. Forming fiducial marks in optical articles raises special challenges in that optical surfaces are typically relatively thick; often well over 1000 microns in thickness. This is the case even in a micro lens array that has micro lenses that are well under a millimeter in diameter. The thickness of the micro lens array makes it virtually impossible to accurately locate a fiducial mark by looking through the micro lens array due to optical limitations. On the one hand, the location accuracy of the fiducial mark relative to the optical article is limited because the fiducial mark is displaced by refracted light passing through the micro lens array material. Moreover, the thickness of the micro lens array limits how close the microscope used for identifying the micro lens array can be positioned to the fiducial mark. Consequently, only lower magnification microscope objectives or more expensive long working distance objectives, can be used to look at the fiducial. Therefore, for optical articles, a method of applying a very accurately located fiducial mark on the side opposite to the optical article is needed.

In U.S. Pat. No. 6,005,294, by Tsuji et al., Dec. 21, 1999, entitled "Method Of Arranging Alignment Marks," a method of making semiconductor devices uses multiple fiducial marks in such a way that the area occupied by the fiducial marks is reduced and the manufacturing productivity is correspondingly increased. While this patent does describe the state of the art for making semiconductor devices, the alignment process described therein is not appropriate for optical articles like lens arrays. As mentioned, in lens arrays, the significant thickness of the various lenses makes it impossible to view fiducial marks from multiple optical articles simultaneously due to the separation distance imparted by the material thickness of the lenses.

Also, U.S. Pat. No. 5,850,276, by Ochi et al., Dec. 15, 1998, entitled "Method Of Making LCD Device Having Alignment Mark Made Of Same Material And Formed At Same Time As Micro lenses" and U.S. Pat. No. 5,771,085, by Ochi et al., Jun. 23, 1998, entitled "LCD Device With an Alignment Mark Having Same Material As Micro lenses" each describe a process for molding fiducial marks into a micro lens screen used for liquid crystal display devices. In these patents the shapes of the fiducial marks are also described in detail. The fiducial marks as described are protrusions in the shape of a cross or several other variations, located on the same side as the micro lenses. The protrusions can be semicircular in cross section or another shape as long as the grooves between the protrusions stand out as dark lines when viewed with a reflecting microscope. The references recognize that lens characteristics, such as thickness, interfere with the ability to identify underlying fiducial marks. Further, the references show some appreciation for useful geometries of fiducial marks and for fiducial marks molded along with a micro lens array. However, neither of the patents show appreciation for fiducial marks applied on the side opposite the optical surfaces in the micro lens array. Furthermore, there is no appreciation by either of the references that advantages can be gained with a molded fiducial mark having lens characteristics.

Moreover, U.S. Pat. No. 6,096,155, by Harden et al., Aug. 1, 2000, entitled "Method Of Dicing Wafer Level Integrated Multiple Optical Elements" discloses the use of fiducials to aid in alignment of micro lenses on wafers during the bonding of multiple wafers together prior to dicing. This patent generally teaches making integrated multiple optical elements with features to help control the thickness of adhesives and solders used to bond together the wafers. While effective use of the fiducial marks is described, there is absolutely no mention of ways to improve alignment of fiducial marks on one side with the optical element on the other side of the wafer. The techniques of embossing and molding fiducial marks, described in the patent, both suffer from locational inaccuracies from one side to the other of the order of plus or minus ten (10) microns. In molded micro lenses and micro lens arrays this inaccuracy is not acceptable.

Furthermore, U.S. Pat. No. 4,598,039, by Fischer et al., Jul. 1, 1986, entitled "Formation Of Features In Optical Material" describes the use of a laser to remove optical material in a controlled fashion. The laser can be used directly on the optical material or a layer of ablative absorber material can be put onto the surface of the optical material to enhance the coupling to the laser. This ablative technique is well suited to making fiducial type marks for alignment. However, the reference does not show appreciation for how to align the laser with a lens array that is located on the opposite side from the desired location for the fiducial marks.

Furthermore, U.S. Pat. No. 6,594,084 B1 "Method for Manufacturing a Precisely Aligned Microlens Array" to Border et al.; U.S. patent application Publication No. 2003/0117482 A1 "Method of Forming Fiducial Marks on a Micro-Sized Article" to Border et al.; U.S. Pat. No. 6,515,800 B1 "Microlens Array" to Border et al.; U.S. Pat. No. 6,587,274 B1 "Double-Sided Microlens Array and Method of Manufacturing Same" to Border et al.; U.S. patent application Publication No. 2003/0118071 A1 "Laser Array and Method of Making Same" to Border et al.; and U.S. patent application Publication No. 2003/0118290 A1 Fiber "Optic Array and Method of Making Same" to Border et al. all describe the use of an optical element in conjunction with a high intensity beam to create a fiducial mark on the opposite surface to the optical feature(s) of interest.

Automatic scanning of microscope slides in a prescribed pattern, including the use of a reference mark for enabling automatic monitoring of the position of the slide is known and described in U.S. Pat. No. 4,833,382 "Method and Apparatus for use in microscope investigations" by Gibbs, May 23, 1989. Furthermore, U.S. Pat. No. 6,175,642 B1, "Device for Automatically Positioning and Centering a Microscope Optical Head" by Gobbi et al. Jan. 16, 2001, describes the use of image analysis to process the image obtained by the microscope to identify specific shapes and orientations of light distributions within said image.

It is an object of the present invention to provide means to create fiducial marks on an optical element consisting of an array of solid immersion lenses in order to facilitate the proper location of the solid immersion lens relative to the optic axis of a system and to enable auto-position scanning of a microscope incorporating such a solid immersion lens array.

SUMMARY OF THE INVENTION

In accordance with one aspect of the present invention there is provided a method for positioning, in a repeatable manner, a near-field optic lens array, comprising the steps of
   providing a cover slide having a near field solid immersion lenses array having least one fiducial mark;
   placing the cover slide in a positioning device;
   locating the at least one fiducial mark by the positioning device; and
   locating the center of each lens in the array with respect to the at least one fiducial mark.

In accordance with another aspect of the present invention there is provided a solid immersion lens array comprising:
   a plurality of solid immersion lenses;
   a body portion in which the plurality of solid lenses are integrally secured, the body portion having a surface designed to engage a sample for viewing of the sample through the plurality of solid immersion lenses; and at least one fiducial mark located on the body portion that can be used to locate the location of each lens of the plurality of solid immersion lens.

In accordance with yet another aspect of the present invention there is provided a system for viewing individual lens provided in a solid immersion lens array comprising:
   a solid immersion assembly having a body portion in which a plurality of solid lenses are integrally secured, the body portion having a surface designed to engage a sample for viewing of the sample through the plurality of solid immersion lenses, and at least one fiducial mark located on the body portion that can be used to locate the location of each lens of the plurality of solid immersion lens;
   a viewing device for individually viewing each lens; and
   a positioning device on which the body portion is placed and moving the body with respect to the viewing device, the positioning device using at least one fiducial mark for locating and positioning each lens with respect to the viewing device.

In accordance with still another aspect of the present invention there is provided a method for making near-field optic lens array wherein each lens of the lens array can be viewed and located individually, comprising the steps of
   providing a cover slide having a near field solid optical lens array having at least one fiducial mark;
   providing at least one fiducial mark on the cover slide; and
   providing a unique identifier on the cover slide that can be used to retrieve locating information for each lens with respect to the at least one fiducial mark.

In accordance with another method according to the present invention there is provided a method for making near-field optic lens array wherein each lens of the lens array can be viewed and located individually, comprising the steps of
   providing a cover slide having a near field solid optical lens array having at least one fiducial mark;

providing at least one fiducial mark on the cover slide;

determining the location of each of the lenses of lens array with respect to the at least one fiducial mark;

providing a unique identifier on the cover slide; and storing the locating information in association with the unique identifier such that the unique identifier can be used to retrieve the locating information with respect to the at least one fiducial mark.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which:

FIGS. 3a and 3b are schematic cross-sectional views of a solid immersion lens array with fiducial marks as taken along line 3—3 of FIG. 1 along with an associated lens;

DETAILED DESCRIPTION OF THE INVENTION

The invention has been described in detail with particular reference to certain preferred embodiments thereof, but it will be understood that variations and modifications can be effected within the scope of the invention.

Figure 1:
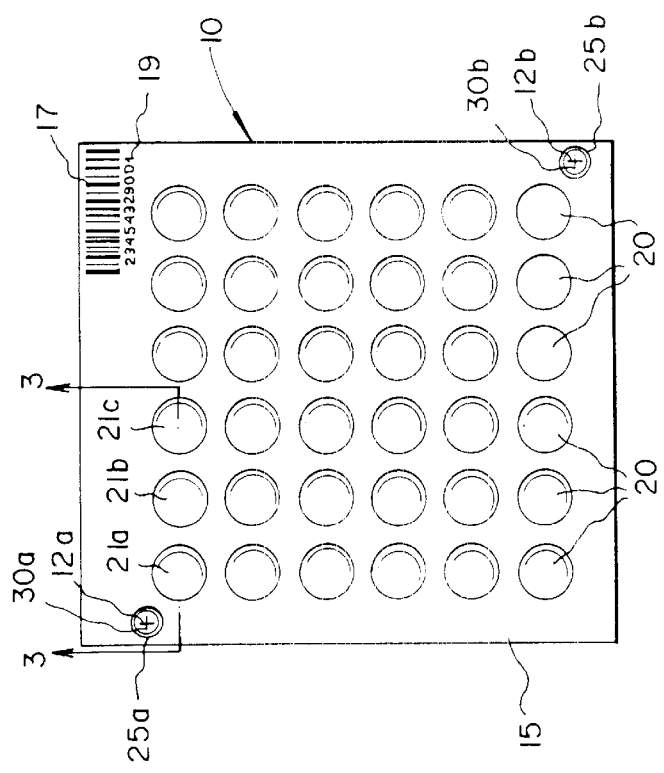
FIG. 1 is a schematic top view of a solid immersion lens array with fiducial marks molded as part of a cover slide made in accordance with the present invention.

FIG. 1 illustrates a top view of a solid immersion lens array assembly 10 comprises fiducial marks 12a and 12b provided on raised posts 25a and 25b to create raised fiducial marks 30a and 30b and a plurality of near field solid immersion lens (SIL) 20 formed on a cover slide 15. The fiducial marks 12a, 12b each identify a specific location on the assembly 10 that reference points can be used for locating items on the assembly 10 as discussed later herein. The method for creating the solid immersion lens array is described in U.S. patent application Ser. No. 10/171,168. The number and spacing of solid immersion lens (SIL)20 on the array 10 can be made to suit the type of sample, which is to be observed. The type of material used to form the solid immersion lens array 10 depends on various parameters. The method disclosed in U.S. Pat. No. 6,301,055 for molding a single SIL lists suitable materials as low temperature of formation polymers, room temperature vulcanization elastomers, low temperature of formation epoxies, polyimides, polycarbonates, and photo resists, or pliant silicone elastomers. A unique machine-readable code 17 and corresponding unique human readable identification number 19 identify each individual solid immersion lens array assembly 10. The machine-readable code 17 can be in any desired machine readable format, for example, a one or two-dimensional bar code, OCR font, etc.

Figure 2:
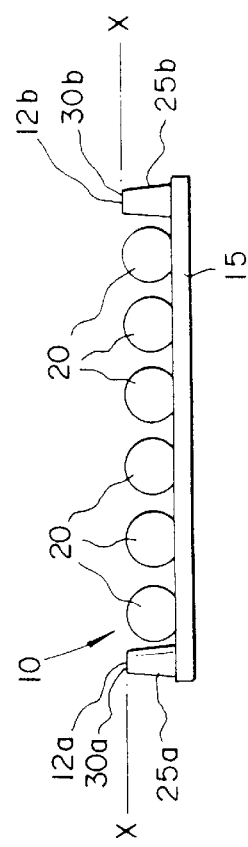
FIG. 2 is a schematic side view of a solid immersion lens array with fiducial marks of FIG. 1.

FIG. 2 illustrates a side view of a solid immersion lens array 10 with marks formed by molding the solid immersion lens 20 as part of the cover slide 15 made in accordance with the present invention. As previously discussed in FIG. 1 like numerals indicate like parts and operations. In the embodiment of the present invention shown in FIGS. 1 and 2 the fiducial mark 12a is located on a raised post 25a and the fiducial mark 12b is located on a raised post 25b. By placing the fiducial marks 12a and 12b on the raised posts 25a and 25b raised fiducial marks 30a and 30b are formed located on the same focal plane X as the top surface of the SIL 20 of the SIL array 10.

Referring to FIGS. 3a and b, there is illustrated a cross-sectional view of a solid immersion lens array 10 as taken along line 3—3 of FIG. 1 along with an associated lens 40 made in accordance with the present invention. As previously discussed in FIG. 1 like numerals indicate like parts and operations. In the embodiment shown in FIGS. 3a and b, a plurality of SIL 20 are molded with the raised fiducial marks 30a and 30b to form the SIL array 10 as part of a cover slide 15. Using the raised fiducial marks 30a and 30b the location of the different SIL 21a, 21b, and 21c can easily be located allowing the user to move a magnifying imaging device 60 (see FIG. 4) collecting/collimating lens 40 in an x and z direction to different positions as shown in FIGS. 3a and 3b to observed different locations of the sample 45 shown in FIG. 4.

Figures 4A, 4B:
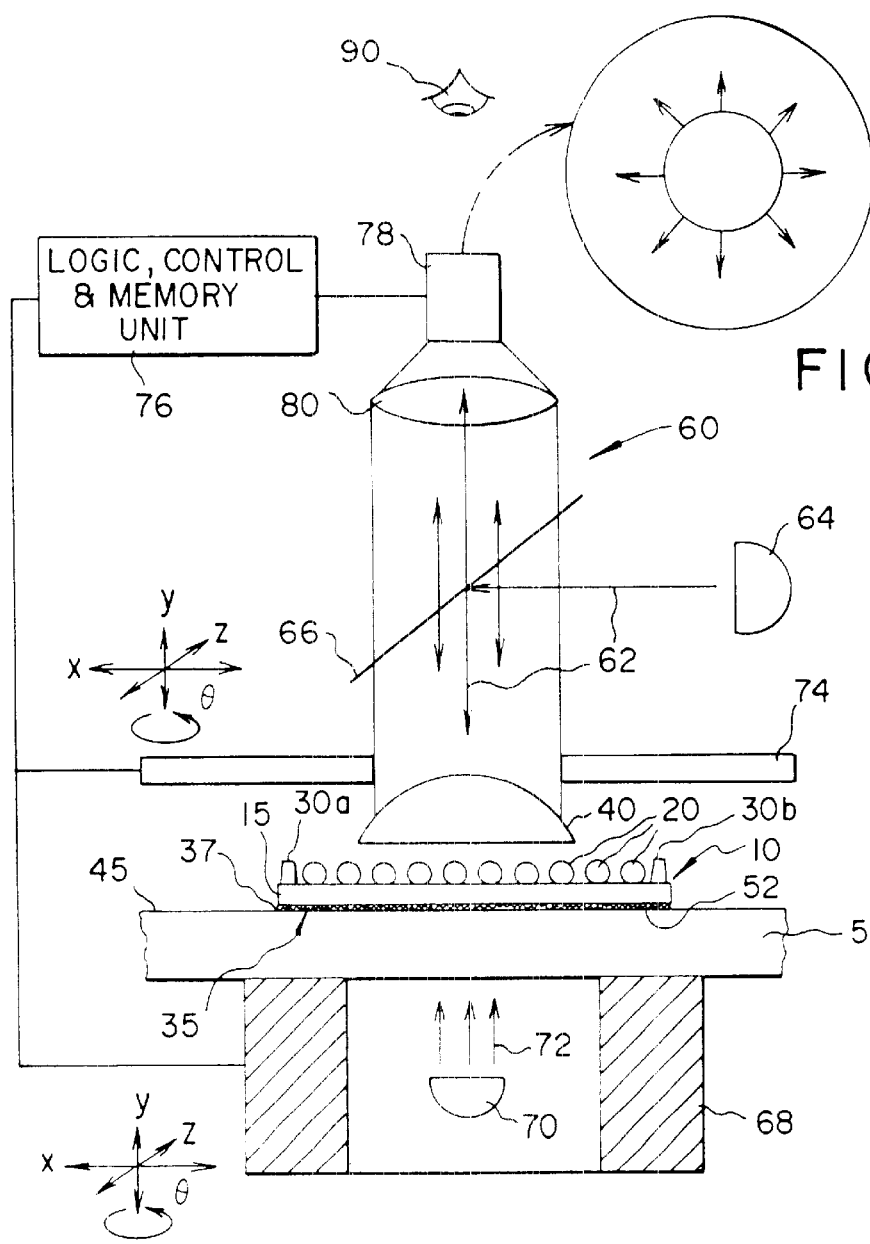
FIG. 4a is a schematic view of the eye piece/sensor of an apparatus that uses the SIL array of FIGS. 1–3.
FIG. 4b is an enlarged top plan view of the apparatus 4a as indicated by the arrow showing the sample being viewed.

Referring now to FIG. 4a, a sample 37 can be viewed and an image captured using the solid immersion lens array 10 and a magnifying imaging device 60 such as a microscope. A light beam 62 from a light source 64 reflects from a beam splitter 66 and passes through the collecting/collimating lens 40 of conventional design and impinges onto the solid immersion lens portion 20 of the solid immersion lens array 10. The sample(or samples) 37 to be observed are placed in the region 35 between the top surface 45 of the slide 50 and the bottom surface 52 of the cover slide 15 as is well known to those skilled in the art. The light beam 62 is reflected from the sample 37, passes through the solid immersion lens array 10, the lens 40, and the beam splitter 66, imaging the sample 37 onto a sensor/eye piece 78 by a lens system 80. The sensor 78 can be a CCD or similar type device. The slide 50 with the solid immersion lens array 10 is located on an x, y, z, and θ positioning device 68. The x, y, z, and θ positioning device 68 can also contain an additional light source 70 whose light beam 72 can be directed to illuminate the slide 50 and sample 37 from underneath. The collecting/collimating lens 40 is positioned in relation to the solid immersion lens array 10 by an x, y, z, and θ positioning device 74. Both positioning devices 68 and 74 and sensor 78 are connected to and controlled by a logic, control and memory unit 76. For example the control and memory unit may be part of a computer (not shown) used to control the positioning devices 74 and 78 along with any viewing device such as magnifying imaging device 60. The light source 72 can be used in place of or in addition to the light source 64. The light sources 64 and 72 can be chosen and filters (not shown) can be added to the light path to provide illumination of a specific wavelength. The light sources 64 and 72 can be lasers or other types of illumination such as UV, IR etc can be used, as appropriate for the type of lens material Referring now to FIG. 4b, an enlarged partial view of the image captured by the device 60 is shown. Using the imaging device 60, images of the light from the SIL 20 of the sample 37 can be displayed for viewing. In addition to observing the sample 37 via a sensor/eye piece 78 and electronic display (not shown) of the sample 37 can be displayed for viewing via the human eye 90.

Referring back to FIG. 4a, the raised fiducial marks 30a and 30b can be viewed and an image captured using the solid immersion lens array 10 and the magnifying imaging device 60. The height of the raised marks 30a and 30b is fabricated so that the height of the raised fiducial marks 30a and 30b matches the height of the solid immersion lens 20 to within a tolerance that is dependent upon the specific shape of the solid immersion lens 20. G. S. Kino in the paper "Fields Associated with the Solid Immersion Lens", SPIE Annual Meeting, Far and Near-Field Optics: Physics and Information Processing, San Diego, July 1998, provides analysis of a number of relevant solid immersion lens designs. For the hemispherical case, the positioning tolerance is given by n$\Delta$z', approximately 66 microns. Where n=index of refraction and delta z'=tolerance on the thickness of the SIL. As long as the height of the raised fiducial marks 30a and 30b matches the height of the solid immersion lens 20 to small fraction of this parameter, say 6–10 microns, the fiducial marks will serve to properly assist on the focusing of the solid immersion lens 20. The solid immersion lens array 10 is fabricated so that the tolerance for the position in the x-z plane of each individual element of the array, the solid immersion lens 20, is smaller than the positioning tolerance for centering each individual the solid immersion lens 20 with respect to the optic axis of the rest of the optical system. The solid immersion lens array 10 is fabricated either with knowledge of the position of each of the solid immersion lens 20 relative to either of the raised fiducial marks 30a and 30b, or in an array where the solid immersion lens 20 are created with a regular periodic spacing between the individual elements. In either case, knowledge of the position of the solid immersion lens 20 elements of the array relative to the raised fiducial indicators 30a and 30b is required. This is preferably determined at the time of manufacture. This locating information is associated with the unique machine readable code 17. The locating information is then made available to the purchase/user of the assembly 10 either by providing the information in a form that can be used by the positioning devices 68, 74 or made available over a communication network, such as the internet that can be accessed by the logic, control and memory unit 76. Correct operation of the entire system demands alignment of the individual solid immersion lens 20 with respect to the other components of the optical system and the optic axis of the system. The optic axis is depicted as the dashed vertical line if FIGS. 3a and 3b. This alignment is performed by first observing the position of the raised fiducial marks 30a and 30b as depicted in FIG. 3a and then moving the predetermined distance in the x-z plane (see FIG. 3b) to precisely position the optical axis of the system with respect to a solid immersion lens 20. In FIG. 3b, this positioning is depicted for the particular solid immersion lens 20, 21c.

Figure 5:
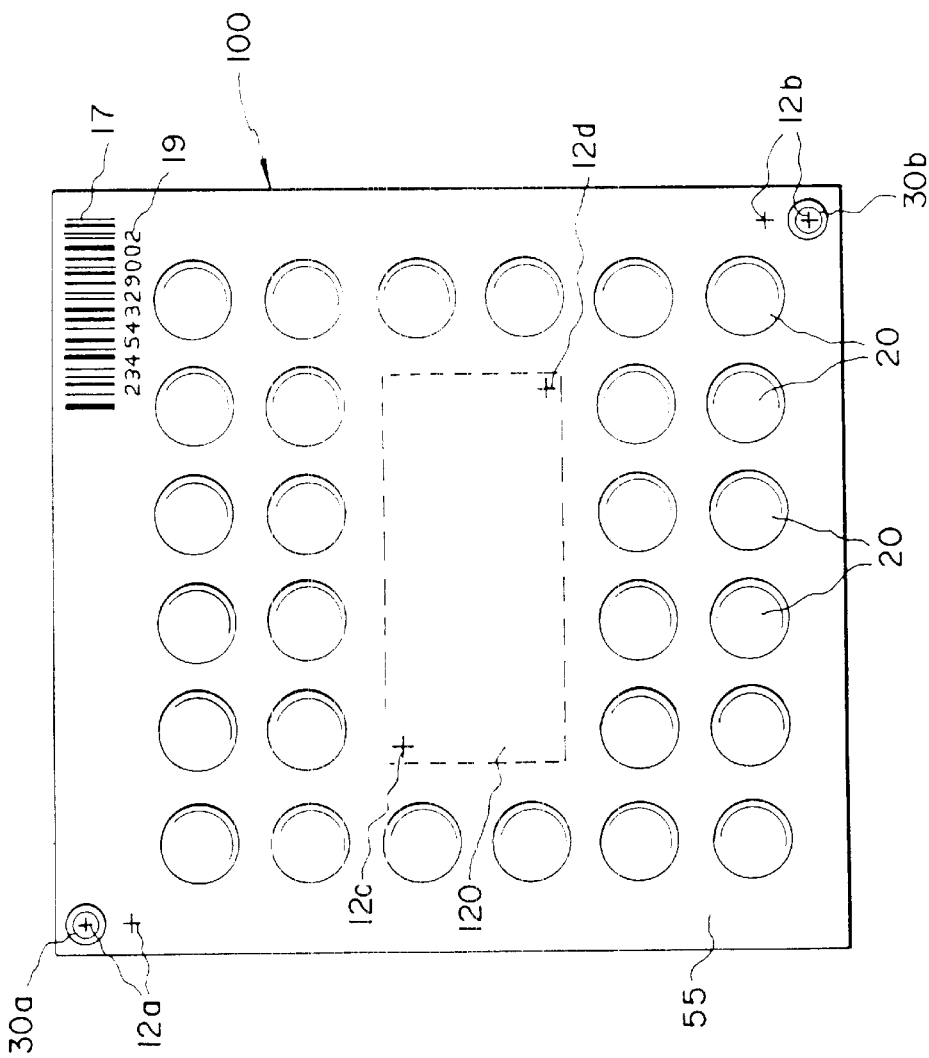
FIG. 5 is a schematic top plan view of another embodiment of the present invention comprising a combination of a solid immersion lens array and a conventional.

In another embodiment FIG. 5 illustrates top plan view of combination of a solid immersion lens 20 and a conventional 55 made in accordance with the present invention. As previously discussed in FIG. 1 like numerals indicate like parts and operations. The solid immersion lens array assembly 100 is comprised of solid immersion lens (SIL) 20 and fiducial marks 12a and 12b formed on a cover slide 55. The fiducial marks 12a and 12b can also be formed on raised posts 25a and 25b to form raised fiducial marks 30a and 30b, which are located on the same focal plane X as the top surface of the SILs 20 as shown in FIG. 2. The number and spacing of the solid immersion lens 20 can be made to suit the type of sample, which is to be observed. An open viewing area 120 devoid of solid immersion lens 20, is provided, which permits the user to observe the sample 37 through the cover slip, see FIGS. 4a and 4b, using the imaging device 60 such as a microscope under normal magnification or through the solid immersion lens 20 at increased magnification. A second set of fiducial marks 12c and 12d maybe used to locate the open viewing area 120. A unique machine-readable code 17 and corresponding unique identification number 19 identify each individual solid immersion lens array assembly 100.

Figure 6:
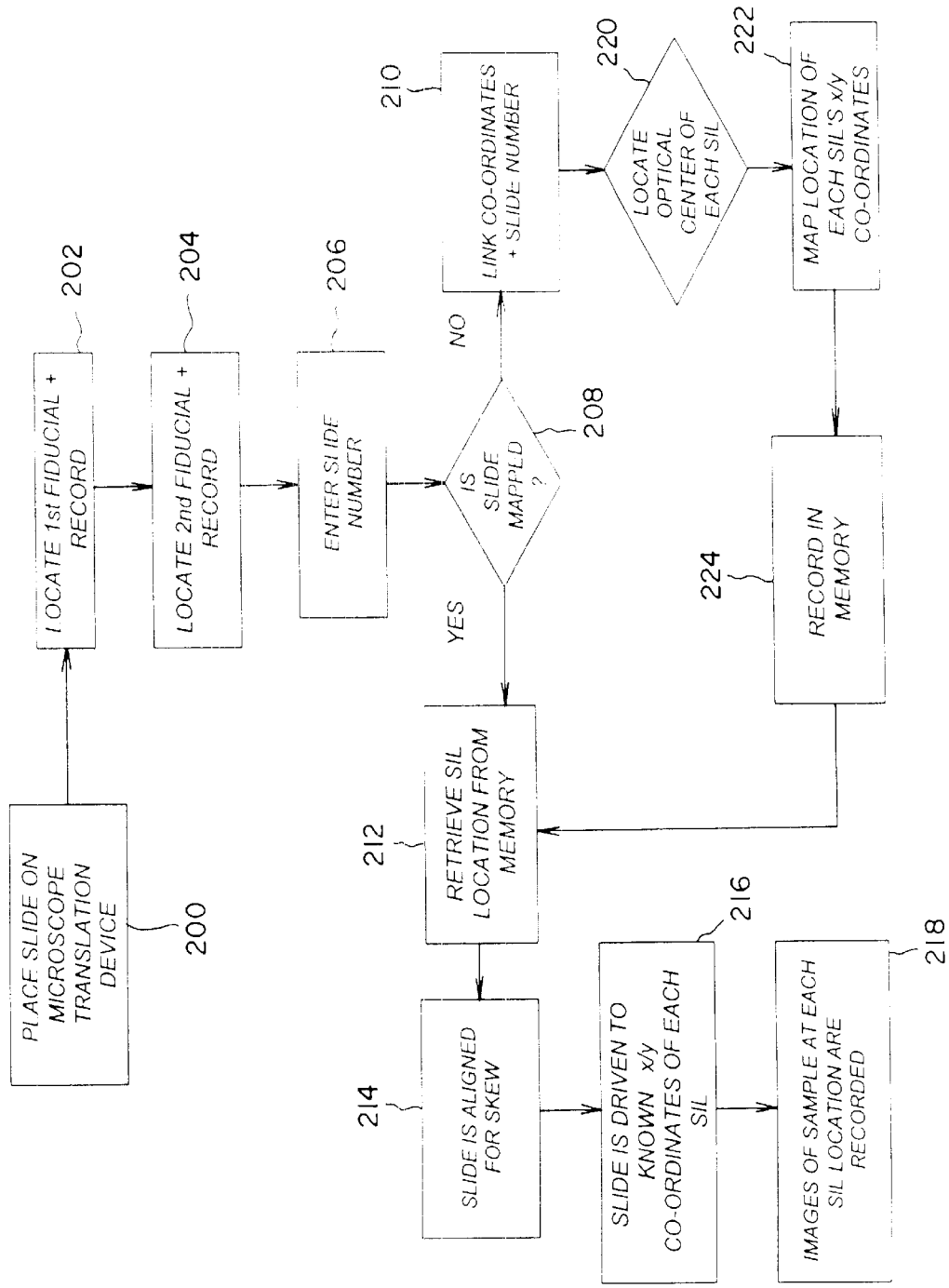
FIG. 6 is a flow chart illustrating the operation of the overall system made in accordance with the present invention.

Referring to FIG. 6, a flow chart illustrates a method using fiducial marks 12a and 12b for locating and/or recording the position of individual SILs 21a, b, and c of a plurality of solid immersion lens (SIL) 20, that are part of a cover slide 15 of lens array assembly 10. The slide 50 and assembly 10 are placed onto the microscope positioning device 68 at step 200. The center of the fiducial mark 12a on the solid immersion lens array 10 is located and its coordinates are recorded (entered) in logic, control and memory unit 76 at step 202. Next the center of the second fiducial mark 12b is located and its coordinates are also recorded (entered) in a logic, control and memory unit 76 at step 204. The unique identification number 19 (see FIG. 1) of the slide 10 is entered into memory 76 manually by an operator via a keyboard or automatically obtained by a scanner (not shown) that scans machine readable code 17 at step 206. The unique identification number is checked against the database of slide codes (identification numbers) that have been previously stored in a logic, control and memory unit 76 at step 208. If the slide code 17 or (identification number 19) is not found, the coordinates of the slide's fiducial marks 12a and 12b are identified and linked to the slide's unique identification number 19 and stored in memory 76 at step 210. If the slide code is found at step 208, the location of all of the SILs 21a, b, and c, in the array 10 (see FIG. 1) are retrieved from memory 76 at step 212. Using the location of the two fiducial marks 12a and 12b, the slide 50 is aligned for skew at step 214, and the slide is driven to the known x/y co-ordinates obtained from the stored data for each SIL 20 at step 216. An image of the sample 37 at each SIL location's observation region 35 is recorded at step 218.

If the locations of the SILs on the slide have not be previously mapped and stored in memory unit 76, the optical center of each SIL 21a, b, and c (see FIG. 1) are located, step 220 and the x/y co-ordinates of each SIL's are recorded in memory 76 at step 224. The procedure now goes to step 212. The same procedure is used to map the location of the open viewing area 120 (see FIG. 5) using fiducial marks 12c and 12d. It is to be understood that various changes and modifications made be made without departing from the scope of the present invention, the present invention being defined by the claims that follow.

The invention has been described in detail with particular reference to certain preferred embodiments thereof, but it will be understood that variations and modifications can be effected within the scope of the invention.

PARTS LIST 10 solid immersion lens array
12a fiducial mark
12b fiducial mark
12c fiducial mark
12d fiducial mark 15 cover slide
17 unique machine-readable code
19 unique identification number
20 solid immersion lens
21a solid immersion lens
21b solid immersion lens
21c solid immersion lens
25a raised post
25b raised post
30a raised fiducial mark
30b raised fiducial mark
35 observation region
37 sample
40 collecting/collimating lens
45 top surface
50 slide
52 bottom surface
55 conventional
60 magnifying imaging device
62 light beam
64 light source
66 beam splitter
68 positioning device
70 light source
72 light beam
74 positioning device
76 logic, control and memory unit
78 sensor/eye piece
80 lens system
90 eye
100 solid immersion lens array assembly
120 normal viewing area
200 step
202 step
204 step
206 step
208 step
210 step
212 step
214 step
216 step
218 step
220 step
222 step
224 step

What is claimed is:

1. A method for positioning, in a repeatable manner, a near-field solid immersion lens array, comprising the steps of:
   providing a cover slide having a near field solid immersion lens array having least one fiducial mark;
   placing said cover slide in a positioning device;
   locating said at least one fiducial mark by said positioning device; and
   locating the center of each lens in the array with respect to said at least one fiducial mark.

2. The method according to claim 1 wherein said step of locating the center of each lens in the array includes obtaining locating information from an unique identifier provided on said.

3. The method according to claim 2 wherein said unique identifier is a machine readable code.

4. The method according to claim 2 wherein said unique identifier is human readable.

5. The method according to claim 2 wherein said locating information is provided by the manufacture of said cover slide.

6. The method according to claim 5 wherein said information is obtained over a communication network.

7. The method according to claim 1 wherein a single viewing device is used to view said solid immersion lens and said at least one fiducial mark.

8. The method according to claim 1 wherein said at least one fiducial mark and said near field solid immersion lens array are provided in the same focal plane.

9. The method according to claim 1 wherein said at least one fiducial mark comprises two fiducial marks.

10. The method according to claim 2 wherein said locating information is obtained by:
    locating said a least one fiducial mark; and
    determining the location of each of lens of said near field solid immersion lenses array with respect to fiducial mark so as to obtain locating information for each of said lens.

11. The method according to claim 10 wherein said locating information is stored in memory.

12. A solid immersion lens array comprising:
    a plurality of solid immersion lenses; and
    a body portion in which said plurality of solid lenses are integrally secured, said body portion having a surface designed to engage a sample for viewing of said sample through said plurality of solid immersion lenses; and at least one fiducial mark located on said body portion that can be used to locate the location of each lens of said plurality of solid immersion lens.

13. A solid immersion lens array according to claim 12 wherein said at least one fiducial mark comprises two.

14. A solid immersion lens array according to claim 12 wherein a window is provided on said body.

15. A solid immersion lens array according to claim 12 wherein said at least one fiducial mark is provided on the same focal plane as said plurality of solid immersion lenses.

16. A solid immersion lens array according to claim 12 wherein there is provided an eye readable unique identification identifier that is associated with locating information of said plurality of solid immersion lenses.

17. A solid immersion lens array according to claim 12 wherein there is a machine-readable unique code that is associated with locating information of said plurality of solid immersion lenses.

18. A solid immersion lens array according to claim 16 wherein said locating information is used by a positioning device for locating each of said lenses with respect to a viewing device.

19. A solid immersion lens array according to claim 17 wherein said locating information is used by a positioning device for locating each of said lenses with respect to a viewing device.

20. A solid immersion lens array according to claim 15 wherein said fiducial mark is provided on a raised portion.

21. A system for viewing an individual lens provided in a solid immersion lens array comprising:
    a solid immersion assembly having a body portion in which a plurality of solid lenses are integrally secured, said body portion having a surface designed to engage a sample for viewing of said sample through said plurality of solid immersion lenses, and at least one fiducial mark located on said body portion that can be used to locate the location of each lens of said plurality of solid immersion lens;
    a viewing device for individually viewing each of said lens; and
    a positioning device on which said body portion is placed and moving said body with respect to said viewing device, said positioning device using said at least on fiducial mark for locating and positioning each of said lens respect to said viewing device.

22. A system according to claim 21 wherein a unique identifier is provided on the assembly that is associated with locating information of each of said lens with respect to said at least one fiducial mark.

23. A system according to claim 22 wherein said unique identifier is human readable.

24. A system according to claim 22 wherein said unique identifier is machine readable.

25. A method for making near-field optic lens array wherein each lens of said lens array can be viewed and located individually, comprising the steps of:

providing a cover slide having a near field solid optical lens array having least one fiducial mark;

providing at least one fiducial mark on said cover slide; and providing a unique identifier on said cover slide that can be used to retrieve locating information for each of said lens with respect to said at least one fiducial mark.

26. A method according to claim 25 a positioning device can used said locating information for positioning said with respect to a viewing device.

27. A method for making near-field optic lens array wherein each lens of said lens array can be viewed and located individually, comprising the steps of providing a cover slide having a near field solid optical lens array having least one fiducial mark;

providing at least one fiducial mark on said cover slide;

determining the location of each of said lens of lens array with respect to said at least one fiducial mark;

providing a unique identifier on said cover slide; and storing said locating information in association with said unique identifier such that said unique identifier can be used to retrieve said locating information with respect to said at least one fiducial mark.

28. A cover slide comprising:

a plurality of solid immersion lenses;

a body portion having a plurality of solid immersion lenses integrally formed therein, said having a surface designed to engage a sample for viewing of said sample through said plurality of solid immersion lenses and an open viewing area designed to engage a sample for viewing of said sample using a microscope under normal magnification; and at least one fiducial mark located on said body portion that can be used to locate the location of each lens of said plurality of solid immersion lens and the open viewing area.

* * * * *

UNITED STATES PATENT AND TRADEMARK OFFICE
CERTIFICATE OF CORRECTION

PATENT NO. : 6,683,723 B2
DATED : January 27, 2004
INVENTOR(S) : Anne E. Bohan et al.

It is certified that error appears in the above-identified patent and that said Letters Patent is hereby corrected as shown below:

Column 9,
Line 60, after "on said" insert -- cover slide --

Column 11,
Line 1, "device, said positioning device using at least on" should read -- device, said positioning device using said at least one --
Line 6, "locating information of" should read -- locating information on --
Line 16, "lens array having least one fiducial mark" should read -- lens array having at least one fiducial mark --
Line 23, "can used said locating information for positioning said with" should read -- can use said locating information for positioning said lens with --

Signed and Sealed this

Twenty-seventh Day of April, 2004

JON W. DUDAS
*Acting Director of the United States Patent and Trademark Office*